United States Patent [19]

Propach et al.

[11] Patent Number: 5,566,000
[45] Date of Patent: Oct. 15, 1996

[54] SYSTEM AND METHOD FOR REDUCING BOTTLENECKS IN LOW DATA RATE NETWORKS PROCESSING FACSIMILE DATA TRANSMISSION

[75] Inventors: David S. Propach; Matthew S. Grob; Paul E. Jacobs, all of San Diego; Gadi Karmi, Del Mar, all of Calif.

[73] Assignee: Qualcomm Incorporated, San Diego, Calif.

[21] Appl. No.: 484,808

[22] Filed: Jun. 7, 1995

Related U.S. Application Data

[62] Division of Ser. No. 152,157, Nov. 15, 1993.

[51] Int. Cl.$^6$ .............................. H04N 1/32; H04N 1/41
[52] U.S. Cl. .................................. 358/412; 358/426
[58] Field of Search ............................ 358/426, 428, 358/261.1, 468, 412, 409; 382/232; 395/114; 370/118; 375/240

[56] References Cited

U.S. PATENT DOCUMENTS

| | | | |
|---|---|---|---|
| 4,549,297 | 10/1985 | Nishmoto | 371/33 |
| 4,568,983 | 2/1986 | Bobick | 358/261.1 |
| 4,571,632 | 2/1986 | Schaphorst et al. | 358/428 |
| 4,677,649 | 6/1987 | Kosuke et al. | 375/122 |
| 4,691,314 | 9/1987 | Bergins et al. | 370/94 |
| 4,719,514 | 1/1988 | Kurahayashi et al. | 358/431 |
| 4,775,893 | 10/1988 | Ishikawa | 358/261.1 |
| 4,841,526 | 6/1989 | Wilson et al. | 371/32 |
| 5,001,571 | 3/1991 | Murano | 358/434 |
| 5,077,742 | 12/1991 | Tsumura et al. | 371/32 |
| 5,105,423 | 4/1992 | Tanaka et al. | 371/5.5 |
| 5,159,465 | 10/1992 | Maemura et al. | 358/405 |

FOREIGN PATENT DOCUMENTS

| | | | |
|---|---|---|---|
| 92203414 | 2/1986 | European Pat. Off. | H04N 1/32 |
| 89104585 | 3/1989 | European Pat. Off. | H04N 1/32 |
| 91302510 | 3/1991 | European Pat. Off. | H04L 1/16 |
| 92301277 | 2/1992 | European Pat. Off. | G06F 3/00 |
| 94107784 | 5/1994 | European Pat. Off. | H04N 1/00 |
| EP91/01222 | 7/1991 | WIPO | H04N 1/32 |
| US92/08376 | 10/1992 | WIPO | H04N 1/32 |

*Primary Examiner*—Scott A. Rogers
*Attorney, Agent, or Firm*—Russell B. Miller; Gregory D. Ogrod

[57] ABSTRACT

System and method for minimizing data bottlenecks in Low Data Rate Networks (LDRNs) that communicate facsimile transmissions. An LDRN is a facsimile network having a transmission data rate less than the data rate of the FAX machines serviced by the network. The system and method can be implemented in any type of LDRN, including analog and digital wired LDRNs, as well as analog and digital wireless (e.g., cellular) LDRNs. The system and method involve processing the facsimile transmissions in order to make the data rates of the LDRN and the FAX machines compatible, thereby minimizing any potential facsimile data bottlenecks that may occur in the LDRN due to its slower data rate. Lines of data are transferred by the LDRN only when the amount of data they contain is less than or equal to a line threshold value, which is adjusted according to the amount of data bottleneck experienced by the LDRN.

4 Claims, 3 Drawing Sheets

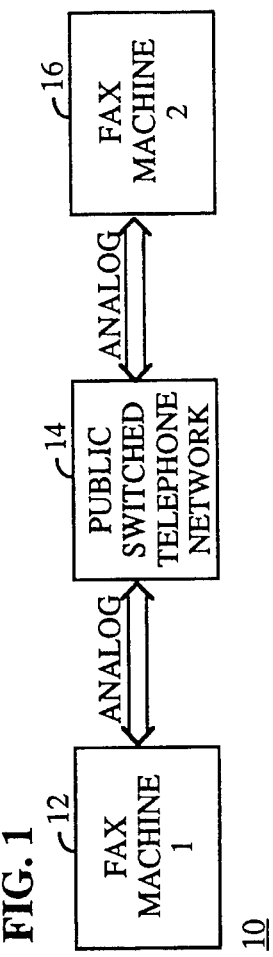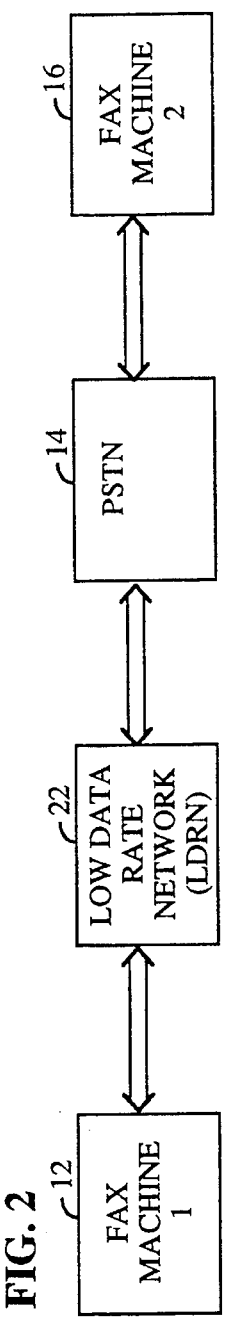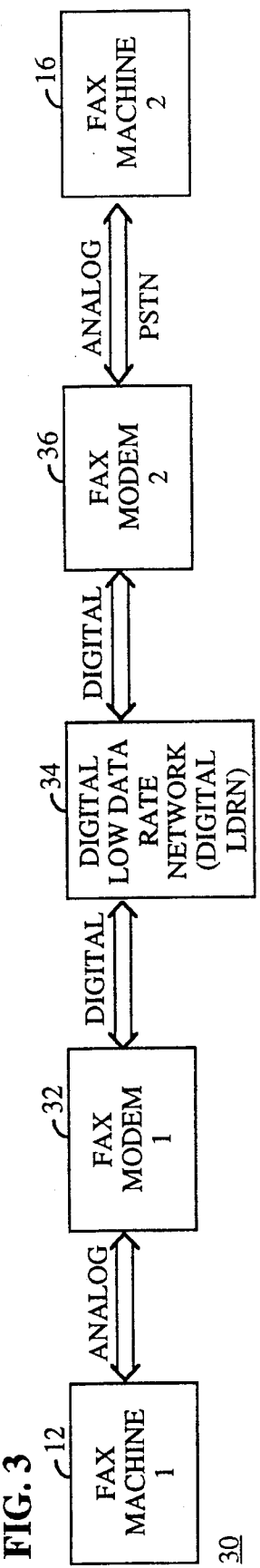

SYSTEM AND METHOD FOR REDUCING BOTTLENECKS IN LOW DATA RATE NETWORKS PROCESSING FACSIMILE DATA TRANSMISSION

This is a divisional of application Ser. No. 08/152,157, filed Nov. 15, 1993.

BACKGROUND OF INVENTION

1. Field of Invention

The present invention relates to facsimile data transmission. More particularly, the present invention relates to a system and method for minimizing a data bottleneck that may arise during facsimile data transmissions over networks operating at data rates lower than the facsimile data rate.

2. Description of the Related Art

Facsimile (fax) machines have come into widespread use. In 1980, the International Telegraph and Telephone Consultative Committee (CCITT) adopted the Group 3 fax standard. The CCITT recommendations (standards) T.30 and T.4 define Group 3 facsimile service, also known as Group 3 FAX and G3 FAX. The recommendation is for "Group 3 facsimile apparatus." Group 3 facsimile apparatus includes fax machines, computers with fax modems and appropriate software, as well as other products. As referred to herein, the term "FAX machine" applies to any Group 3 facsimile apparatus.

T.30 defines the messages used by Group 3 FAX machines to communicate with one another. This communication includes fax call identification, fax parameter negotiation, training (to verify that higher data rates can be used over a telephone connection), page transmittal, confirmation of reception, and call release. T.4 defines several ways to encode images on a page of a document to be transmitted by a facsimile network.

T.30 was written for facsimile service provided over a wired telephone network, or a Public Switched Telephone Network (PSTN). In such a network, delays are fixed between transmission and reception during a call. Moreover, the data rates supported by the network are always as fast as the facsimile data rates sent over the network. In this environment, T.30 requires strict time constraints between transmissions and responses occurring between communicating FAX machines.

Such time constraints can be difficult to meet when Group 3 facsimile transmissions are attempted over data channels with different characteristics than a wired telephone network. For example, in the wireless environment (e.g., a cellular network), two conditions exist that do not arise during a wired telephone network fax transmission. First, the wireless environment has varying delays between transmission and reception. Second, the data rates over a wireless network are typically less than a wired network and may be less than the rate of fax data transmissions.

When the data rate over the wireless network is less than the fax transmission rate, a data bottleneck will occur between the transmitting FAX machine and the receiving FAX machine (i.e., at the transmission side of the wireless network), causing delay in the fax transmission. Other, non-wireless facsimile networks may also have such a limited data rate and may thus incur data bottlenecks when performing facsimile transmissions. The delays associated with such limited data rate networks can cause T.30 timeouts to expire, resulting in the transmitting FAX machine hanging up during a facsimile call before data transmission is complete. These data channels will be referred to as Low Data Rate Networks (LDRNs), in which the data rates are lower than the fax transmission data rate.

In light of the foregoing, a need exists for an LDRN that can transmit fax data and at the same time minimize data bottlenecks that may arise in the LDRN during fax transmissions.

SUMMARY OF THE INVENTION

Accordingly, the present invention is directed to a system and method for minimizing a data bottleneck in an LDRN.

Additional features and advantages of the invention will be set forth in part in the description that follows, and in part will be apparent from the description, or may be learned by practice of the invention. The objects and advantages of the invention will be realized and attained by the system and method particularly pointed out in the written description and claims in this application, as well as in the appended drawings.

To achieve the advantages of the invention and in accordance with the purpose of the invention, as embodied and broadly described herein, the invention is a method for minimizing a data bottleneck in a Low Data Rate Network (LDRN) having a data storage buffer. The method includes two steps. First, a data stream is transmitted from a facsimile (FAX) machine to the LDRN, the data stream being divided into blocks, and the blocks being divided into frames. A number of bytes of the data stream are temporarily stored in the data storage buffer. Second, the LDRN requests the FAX machine to re-transmit at least one of the frames, the number of frames to be re-transmitted being a function of the number of bytes of the data stream stored in the data storage buffer.

In another aspect, the present invention is a method for minimizing a data bottleneck in an LDRN having a first side and a second side and having a one-dimensional image data format and a two-dimensional image data format. The method includes several steps. First, the LDRN sets a first FAX machine to the one-dimensional image data format. Then, the first FAX machine sends to the first side of the LDRN, a data stream encoded in the one-dimensional image data format. The received data stream is subsequently uncompressed and re-encoded into the two-dimensional image data format. The first side of the LDRN then transmits the re-encoded data stream to the second side of the LDRN, where it is again uncompressed and re-encoded into the one-dimensional image data format. Finally, the second side sends the re-encoded, one-dimensional data stream to a second FAX machine.

In yet another aspect, the present invention is a method for minimizing a data bottleneck in an LDRN having a first side and a second side, in which the data bottleneck has a quantity of bottlenecked data. A data stream encoded in an image data format is sent from a first FAX machine to the first side of the LDRN. The data stream is then uncompressed in the first side, causing it to be converted into a bit mapped image having image data. The bit mapped image is then processed such that the image data is reduced by an amount of data equal to the quantity of bottlenecked data. Next, the processed bit mapped data is image compressed and transmitted from the first side to the second side of the LDRN, where it is again uncompressed. The uncompressed data is then reverse processed, thereby substantially recreating the original data stream. This data stream is re-encoded to the image data format and is sent from the second side of the LDRN to a second FAX machine.

In still another aspect, the present invention is a method of minimizing a data bottleneck in an LDRN having a first side and a second side. The method includes two steps. First, a data stream is transmitted from a FAX machine to the first side of the LDRN, the data stream including data lines. Second, the transmitted data stream is processed in the first side of the LDRN, including dropping every $N_{minsent}$+ $INT(N_{drop-window}*R_{uniform}(0,1))$ data line. In this equation, $N_{min-sent}$ corresponds to a minimum number of contiguous undropped data lines, $N_{drop-window}$ corresponds to a window of droppable data lines, and $R_{uniform}(0,1)$ is a function that outputs a uniformly distributed real value between 0 and 1.

In another aspect, the present invention is a method for minimizing a data bottleneck in an LDRN having a first side and a second side and having a line length threshold (LLT). This method also includes two steps. First, a data stream is transmitted from a FAX machine to the first side of the LDRN. The data stream has lines of dam, each of the lines in turn having a line length. Second, in the first side of the LDRN, the transmitted data stream is processed, including dropping each of the data lines for which the line length exceeds the LLT.

In still another aspect, the present invention is a method for minimizing a data bottleneck in an LDRN having a first side and a second side. The LDRN is coupled to a first FAX machine and a second FAX machine, the first and second FAX machines being capable of negotiating a value corresponding to a Minimum Scan Line Time (MSLT). Data is scanned and decoded into data lines using the first FAX machine. The scanned and encoded data is then processed, including inserting fill bits into each of the data lines having a bit value less than the MSLT value, causing the bit value for all of the data lines to equal or exceed the MSLT value. The processed data is next transmitted from the first FAX machine to the first side of the LDRN, where it is again processed, including removing the fill bits from each of the filled data lines. This unfilled dam is transmitted from the first to the second side of the LDRN, where it is once again processed, including reinserting the removed fill bits into their respective data lines. Finally, the refilled data is transmitted from the second side of the LDRN to the second FAX machine.

It is to be understood that both the foregoing general description and the following derailed description are exemplary and explanatory only and are not restrictive of the invention, as claimed.

The accompanying drawings are included to provide a further understanding of the invention and are incorporated in and constitute a part of this specification, to illustrate embodiments of the invention, and, together with the description, to serve to explain the principles of the invention.

BRIEF DESCRIPTION OF THE DRAWINGS

FIG. 1 is a diagrammatical representation of a wired PSTN facsimile network.

FIG. 2 is a diagrammatical representation of a wired Low Data Rate Network coupled to a PSTN.

FIG. 3 is a diagrammatical representation of a Low Data Rate Network for facsimile transmission.

DETAILED DESCRIPTION OF THE PREFERRED EMBODIMENT

Figure 4:
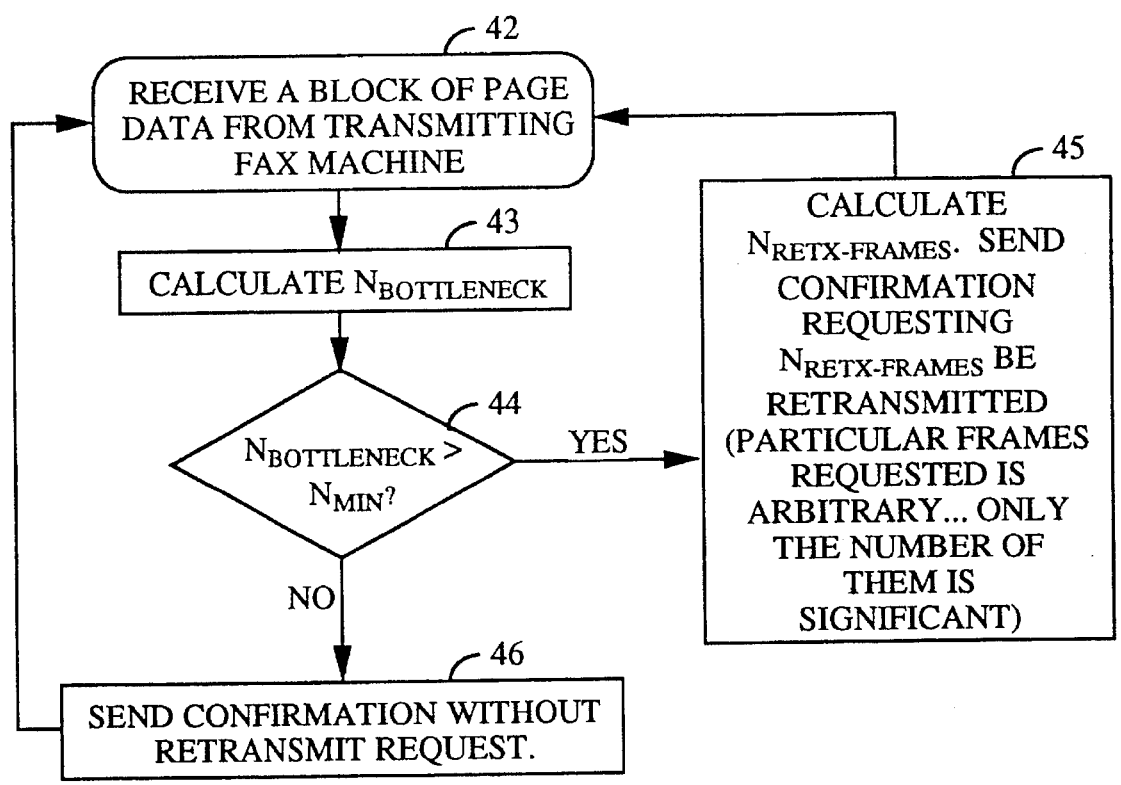
FIG. 4 is a flow-diagram illustrating the steps involved in a method for minimizing data bottlenecks in accordance with the present invention.

Reference will now be made in detail to the present preferred embodiments of the invention, examples of which are illustrated in the accompanying drawings. Wherever possible, the same reference numbers will be used throughout the drawings to refer to the same or like parts. A basic facsimile transmission includes several steps. The first step is called setup, during which a calling FAX machine dials the telephone number of a called FAX machine. The called FAX machine answers the ring signal initiated by the calling FAX machine by going offhook, thereby waking up the rest of the called FAX machine.

The next step is a pre-message procedure. Here, the called FAX machine first sends a digital identification signal to the calling FAX machine identifying the called FAX machine's capabilities. In response, the calling FAX machine automatically sends a digital command signal describing to the called FAX machine the fax parameters that will be used for this facsimile transmission. The calling FAX machine uses its own capabilities and those of the called FAX machine to determine these parameters (i.e., uses the highest common set of facsimile parameters). These parameters include the speed of transmission of page data, the encoding format for the image data, whether standard features such as error correction will be used, as well as non-standard facilities that may be used by particular facsimile machine manufacturers. The calling FAX machine also trains with the called FAX machine to verify that the highest available transmission speed will work. If not, the machines slow down until they find the fastest speed that does pass training.

The final three steps are message transmission, post-message procedure, and call release. Following the pre-message procedure is message transmission, during which the calling FAX machine transmits to the called FAX machine a data stream corresponding to information contained on a document page. The called FAX machine, in turn, confirms reception of each page. Following message transmission is post-message procedure, which occurs after each page has been sent. During this step, the calling FAX machine sends a signal to the called FAX machine indicating that transmission of a page is complete and whether other pages are still to be sent, and in response the called FAX machine sends a message confirmation signal indicating the page was successfully received. Call release occurs after all pages of the document have been transmitted by the calling FAX machine. In this step, the calling FAX machine sends a disconnect signal, and both FAX machines disconnect from the telephone line and terminate communication with one another.

FIG. 1 illustrates a typical, hard-wired facsimile network 10 operating over a Public Switched Telephone Network (PSTN). A first (or calling) FAX machine 12 is connected over the PSTN 14 to a second (or called) FAX machine 16. The two FAX machines 12, 16 communicate with one another, as described above, by means of analog signals sent over the PSTN 14. The signals are considered analog, even though many parts of a PSTN may be digital. In this PSTN facsimile network 10, the data rates supported by the network are always as fast as the facsimile data rates to be sent over the network. Accordingly, data bottlenecks do not occur during fax transmissions made over such PSTN facsimile networks.

A wired network, however, may also incorporate a Low Data Rate Network (LDRN). As illustrated in FIG. 2, an LDRN 22 may be used in combination with a PSTN 14, creating an LDRN/PSTN network 20. In the wired PSTN/ LDRN network 20, a first (or calling) FAX machine 12 and a second (or called) FAX machine 16 are connected over the PSTN 14 and the LDRN 22. The two FAX machines send and receive analog signals via the PSTN 14 and LDRN 22, although the LDRN 22 can be either analog or digital, a digital LDRN requiring circuitry to convert the transmitted signals from analog to digital and vice versa. When the calling FAX machine 12 is transmitting, data will arrive at the LDRN 22 at a fax transmission (or data) rate. This data then leaves the LDRN at a slower rate to be transmitted across the LDRN. This results in data collecting at the side of the LDRN receiving the data from the calling FAX machine. Such data collection continues until the calling FAX machine 12 finishes transmitting data, after which the data build-up (or bottleneck) diminishes in the LDRN 22 until all of the data is transmitted across the LDRN. During this time, the calling FAX machine 12 waits for a confirmation signal from the called FAX machine. If the bottleneck causes too much delay, the calling FAX machine will hang up before the confirmation signal is sent.

In a wireless environment, an analog wireless network or digital wireless network may be used, each of which has a first and a second side for transmission and reception of fax data. When implementing fax transmission and reception over a digital wireless network, an example of which is shown in FIG. 3, the network 30 must demodulate the analog fax transmission on each side, send it across the network in digital form, and then modulate it back into an analog signal on the other side of the network. Each side of the digital wireless network can be equipped with a FAX modem 32, 36, which performs these functions within the network 30. Modem is short for MOdulator/DEModulator.

As with the PSTN/LDRN network 20, when a digital or analog wireless network operates at a data rate less than that of a fax transmission (that is, the network is an LDRN), a bottleneck will occur at the input side of the network. Because the data rate in the wireless LDRN is lower than the facsimile transmission data rate, data bottlenecks will arise and escalate during fax data transmissions. As in the LDRN/ PSTN network 20, these bottlenecks may become so large in an analog or digital wireless network as to cause the calling FAX machine to terminate the call before it has completed its data transmission.

Accordingly, in any LDRN fax network, data bottlenecks can occur. Such bottlenecks impede the flow of data across the network and can be disastrous if they become large enough to cause fax transmissions to prematurely terminate.

Therefore, in accordance with the present invention, a system and method are provided for minimizing data bottlenecks in a facsimile LDRN. The remainder of this description explains methods and system for data bottleneck minimization as embodied in a digital wireless network having an LDRN, such as that shown in FIG. 3. These methods can be likewise implemented in an analog wireless network or the PSTN/LDRN network 20, whether analog or digital. An exemplary embodiment of the digital LDRN system of the present invention is shown in FIG. 3 and is designated generally by reference numeral 30.

Referring to FIG. 3, the system for minimizing a data bottleneck in a digital LDRN includes a first FAX machine 12, a first FAX modem 32, a digital LDRN 34, a second FAX modem 36, and a second FAX machine 16. The first FAX machine 12 and the first FAX modem 32 can be coupled to one another through a wired telephone network, as can be the second FAX machine 16 and the second FAX modem 36. Both FAX modems 32, 36 are, in turn, coupled to the digital LDRN 34. Preferably, the FAX modems are included within the LDRN 34. The details of this system are described below.

In this system, the first FAX machine 12 and the second FAX machine 16 are conventional facsimile machines, preferably Group 3 FAX machines, as defined under the standards of the International Telegraph and Telephone Consultative Committee (CCITT). Alternatively, the system of the present invention could be implemented using Group 1, Group 2, or Group 4 FAX machines. To so implement the system, the methods described herein would have to be altered to the extent necessary to account for the different CCITT recommendations or standards (e.g., T.2, T.3, or T.6) for those FAX machine groups.

The first FAX machine 12 and the second FAX machine 16 are both capable of transmission and reception. Accordingly, both FAX machines are capable of sending as well as receiving analog signals. Because Group 3 fax machines are compatible with standard telephone lines, i.e., a PSTN, the first and second FAX machines 12, 16 can be installed merely by plugging them into a telephone jack. If a PSTN is not used, a private voice or digital channel is needed.

As shown in FIG. 3, the first and second FAX machines 12, 16 are connected over standard telephone lines (PSTN) to the first and second FAX modems 32, 36, thereby enabling the FAX machines to send and receive analog signals to and from the FAX modems. The first FAX modem 32 and the second FAX modem 36 are used to demodulate the analog facsimile transmissions being sent by the FAX machines 12, 16. In this way, both FAX modems convert the analog facsimile transmissions into digital form. In addition, both FAX modems 32, 36 are used to modulate the digital facsimile signals transmitted over the digital LDRN 34, converting those digital signals back into analog facsimile signals for transmission to the FAX machines 12, 16.

As noted above, the first FAX modem 32 and the second FAX modem 36 are preferably located within the LDRN 34. Alternatively, the FAX modems could be located, for example, at the same location having the FAX machines 12, 16, or anywhere else between the FAX machines and the LDRN 34. In either of these latter implementations, a private digital channel is needed for communication between the LDRN 34 and the FAX modems 32, 36.

For the remainder of this description, the digital LDRN 34 will be referred to as having a first side and a second side, the two sides being in communication with one another over the LDRN. For simplification, the first side will be referred to as including the first FAX modem 32 and other circuitry and software contained within the digital LDRN 34. Similarly, the second side will be referred to as including the second FAX modem 36 as well as other circuitry and software contained within the LDRN 34. As will be apparent to those skilled in the art, additional FAX modems and FAX machines can be coupled to the LDRN, which is capable of simultaneously transmitting many digitized facsimile signals.

In accordance with the present invention, a method and system incorporating the Error Correction Mode (ECM) defined in CCITT T.30 and T.4 can be used to minimize a data bottleneck in the digital LDRN 34. The ECM is part of T.30 (i.e., it is standard in the T.30 Recommendation), but is an optional feature on a Group 3 FAX machine. This means that FAX machine manufacturers need not implement ECM to be Group 3 compliant. Nevertheless, if ECM is used during a fax call (i.e., both machines have the capability and negotiate to use it), ECM can be used by the LDRN 34 to keep a fax call from being prematurely terminated, i.e., timing out, due to a data bottleneck.

One way to reduce the data bottleneck using ECM is to use the flow control mechanism designed into ECM. This mechanism allows the called FAX machine (either the first FAX machine 12 or the second FAX machine 16) to hold-off the calling FAX machine (again, either the first or second FAX machine 12, 16) for a period of time. This is part of the T.30 standard.

Alternatively, ECM may be used in conjunction with a retransmission function to minimize data bottlenecks. In the ECM, data contained on a document page to be transmitted from one FAX machine to another is divided into blocks. Each block is further divided into a number of frames. There can be 256 or 64 frames per block (negotiable between the FAX machines) and up to 256 blocks per page. Between transmission of each block of data, the called FAX machine can request the calling FAX machine to re-transmit frames within the current block. The called FAX machine can do this up to four times per block. In normal operation, such retransmission requests are only performed when a block is received with errors, or where the block is completely missed by the called FAX machine.

This retransmission function, however, can be used by the LDRN 34 to delay the calling FAX machine while the LDRN 34 sends data over the LDRN. In such a method, a data stream corresponding to the data contained on the document page is transmitted in analog form from the first FAX machine 12 to the first FAX modem 32 (i.e., the first side of the LDRN 34), where the data stream is converted into digital form. When the data rate from the first FAX machine 12 is greater than the data rate of the LDRN 34, some of the data in the data stream will accumulate in some type of memory device (e.g., a data transmit buffer) included in the first side of the LDRN 34.

In order to prevent such data accumulation, the digital LDRN 34 can be used to keep the first FAX machine 12 busy by requesting it to re-transmit data frames that were received correctly by the LDRN. The particular frames the LDRN 34 requests to be re-transmitted is arbitrary. The number of frames requested for retransmission can be calculated using an algorithm that minimizes the bottleneck effect when the LDRN 34 operates at a slower data rate than the facsimile transmission. The following formula is used to minimize the bottleneck effect:

$$N_{RETX\text{-}Frames} = INT[(T_{overhead} + (L_{Bottleneck}/R_{fax}))/(L_{Frame}/R_{LDRN})]. \quad (1)$$

In equation (1), $N_{RETX\text{-}Frames}$ corresponds to the number of frames that the LDRN 34 will request the calling FAX machine to re-transmit. INT indicates that the number of re-transmit frames is an integer value, rather than a fractional value. In addition, $T_{overhead}$ is a fixed value determined empirically, accounting for the time it takes to request retransmission, for the time needed by the FAX machine to setup for the retransmission, and the time to transmit the confirmation signal for the requested retransmission. $T_{overhead}$ does not include, however, the time required to actually re-transmit the requested frames. $L_{Bottleneck}$ corresponds to the amount of data stored in the LDRN/modem data transmit buffer still to be sent over the LDRN 34, and $R_{fax}$ corresponds to the data rate of the facsimile transmission. $L_{frame}$ is the amount of data in a single fax data frame, and $R_{LDRN}$ is the data rate of the digital LDRN 34.

The goal is to have the transmitting fax machine begin transmitting a new block of data just as the bottleneck empties at the LDRN 34. This would minimize the delay created by having an LDRN data rate less than the fax transmission data rate.

The calculation in equation (1) is performed and thus retransmission of data frames requested, however, only upon satisfaction of an initial condition. Namely, the number of re-transmit data frames to allow the LDRN 34 to empty its data buffer ($N_{Bottleneck}$) must be greater than a fixed integer value ($N_{min}$). This prevents unnecessary retransmission of data frames (i.e., when the bottleneck effect is not substantial enough to warrant retransmission). $N_{Bottleneck}$ is calculated as follows:

$$N_{Bottleneck} = INT[(T_{Bottleneck}/T_{frame})] = INT[(L_{Bottleneck}/R_{fax})/(L_{frame}/R_{LDRN})], \quad (2)$$

where $L_{Bottleneck}$, $R_{fax}$, $L_{frame}$, and $R_{LDRN}$ are the same variables as those described with respect to equation (1).

Referring now to FIG. 4, a flow-diagram is provided illustrating the ECM retransmission method. The process begins in step 42, at which point a block of data from a page of the document being transmitted by the first FAX machine 12 is received in the first side of the LDRN 34. Using this block of data, the next step 43 is to calculate $N_{Bottleneck}$ using equation (2). Upon performing this calculation, the next step 44 involves comparing $N_{Bottleneck}$ to $N_{min}$. If $N_{Bottleneck}$ is greater than $N_{min}$, as show in step 45, $N_{RETX\text{-}frames}$ is calculated using equation (1), and a send confirmation signal is sent from the first side of the LDRN 34 to the first FAX machine 12, requesting that the first FAX machine re-transmit the $N_{RETX\text{-}frames}$. The particular data frames that the LDRN requests to be re-transmitted is arbitrary; only the number of frames, i.e., $N_{RETX\text{-}frames}$, is significant.

On the other hand, if in step 44 $N_{Bottleneck}$ is less than $N_{min}$, retransmission of data frames will not be requested by the LDRN 34. Rather, as shown in step 46, the LDRN will send a confirmation signal to the first FAX machine 12 without a retransmission request, and the procedure will be repeated with the next block received.

As will be apparent to those skilled in the art, the methods for minimizing data bottlenecks using the ECM can be implemented with circuitry included in the LDRN 34, the FAX modems 32, 36, or both. Preferably, the circuitry will use LSI and/or VLSI components. Alternatively, the method can be implemented with software, or some combination of software and circuitry.

A second embodiment of the present invention involves employing compression methods to increase the rate at which data is transmitted by an LDRN to minimize data bottlenecks in the LDRN. As with the ECM methods, the compression methods can be implemented with hardware, software, or a combination of the two.

The T.4 recommendation or standard includes different encoding formats. As part of the facsimile negotiation between two communicating facsimile machines, this encoding format is set to either one-dimensional or two-dimensional (1-D or 2-D). Referring again to FIG. 3, in the compression scheme, the digital LDRN 34 forces the FAX machines 12, 16 to use the 1-D format, while the LDRN 34 uses the more efficient 2-D format to transmit a stream of data from one side of the LDRN to the other side. Now in the 1-D mode, the first FAX machine 12, for example, can send a data stream encoded in the 1-D image data format to the first side of the digital LDRN 34. Once received at the first side, the data stream is digitized and uncompressed. The LDRN then re-encodes the uncompressed data stream into the 2-D image data format and transmits the re-encoded data stream from the first side over-the-air to the second side of the LDRN 34. Once received at the second side, the transmitted data stream is again uncompressed, is re-encoded back into the 1-D image data format, and is converted back into analog form. The second side of the LDRN 34 then sends the re-encoded analog data stream to the second FAX machine 16. The second FAX machine 16 decodes the data stream and outputs it in a format readable by a user.

Alternatively, the compression method can be implemented using image processing, in which a non-standard image data format (or image encoding) is used over the digital LDRN 34. In this alternative compression scheme, the first FAX machine 12 sends a data stream encoded in a standard image data format (1-D or 2-D) to the first side of the LDRN 34. The first side decompresses and digitizes the data stream, converting it into a bit mapped image having image data. This bit mapped image is then processed, thereby reducing the amount of image data. The amount of reduction should correspond to the difference in the fax data transmission rate and the LDRN data rate. Such image processing may involve remapping the image into fewer pixels (i.e., an image having reduced resolution). No matter what the image processing scheme used, the amount of image data will be less than the original amount sent from the first FAX machine 12 by an amount accounting for the data bottleneck at the first side of the digital LDRN 34.

The processed bit mapped data is then compressed and transmitted from the first side of the LDRN 34 to the second side of the LDRN. At the second side, the transmitted data is uncompressed and reverse processed, whereas in the second side of the LDRN, the uncompressed bit mapped data is re-encoded into the original T.4 image data format (1-D or 2-D). In this way, the original stream of data sent from the first FAX machine 12 is substantially recreated. This recreated data is converted back into analog form and sent from the second side of the LDRN 34 to the second FAX machine 16.

In a third embodiment of the present invention, lines of facsimile image data are dropped, such that the dropped data lines are not sent from the first to the second side of an LDRN thereby minimizing data bottlenecks. In this method, a short indication signal is sent, for example, from the first side to the second side of the LDRN 34, indicating that a line of data was dropped. On the second side, the LDRN inserts a data line to replace and/or replicate the dropped data line. The inserted line can be a repeat of the data line preceding the dropped line, or can be a line that is created by performing an image processing function on the previous N lines, N being some predetermined number. As with the ECM and compression methods, this method can also be implemented with hardware, software, or a combination of the two.

Various algorithms can be selected for deciding which lines of data to drop. First, every $N^{th}$ line could be dropped. In this case, a data stream would be transmitted from the first FAX machine 12 to the first side of the LDRN 34, the data stream comprising several data lines. Once received in the first side, the data stream would be processed and every $N^{th}$ line dropped.

Second, a flexible equation can be used to determine how many contiguous data lines are to be transmitted before dropping the next line. Here, the data stream can be transmitted from the first FAX machine 12 to the first side of the LDRN 34, the data stream again comprising data lines. Once received at the first side of the LDRN, the data stream is processed, including determining the contiguous data lines, $N_{contiguous}$, to be transmitted between dropped lines, $N_{contiguous}$ being calculated according to the following equation:

$$N_{contiguous} = N_{min-sent} + INT[(N_{drop-window} * R_{uniform}(0,1)].  \quad (3)$$

In equation (3), $N_{min-sent}$ corresponds to a minimum number of contiguous undropped data lines, $N_{drop-window}$ corresponds to a window of droppable data lines, and $R_{uniform}(0,1)$ is a function that outputs uniformly distributed real values between 0 and 1.

$N_{min-sent}$ and $N_{drop-window}$ are chosen such that, on average, the data bottleneck at the LDRN 34 is minimized. These values must also be selected to minimize the impact on the quality of the fax data image. In order to satisfy these requirements, separate values can be selected for pairs of ($N_{min-sent}$, $N_{drop-window}$) corresponding to different facsimile image encoding formats, different LDRN data rates, and different fax transmission data rates. A lookup table can be employed for each of the ($N_{min-sent}$, $N_{drop-window}$) pairs in order to implement selection of such values.

No matter which algorithm is employed, once processed, the data stream is transmitted from the first side of LDRN 34 to the second side along with the indicator signals. As noted above, each indicator signal corresponds to a dropped data line. In the second side of the LDRN 34, a new data line will be inserted for each of the dropped lines, as described above.

Figure 5:
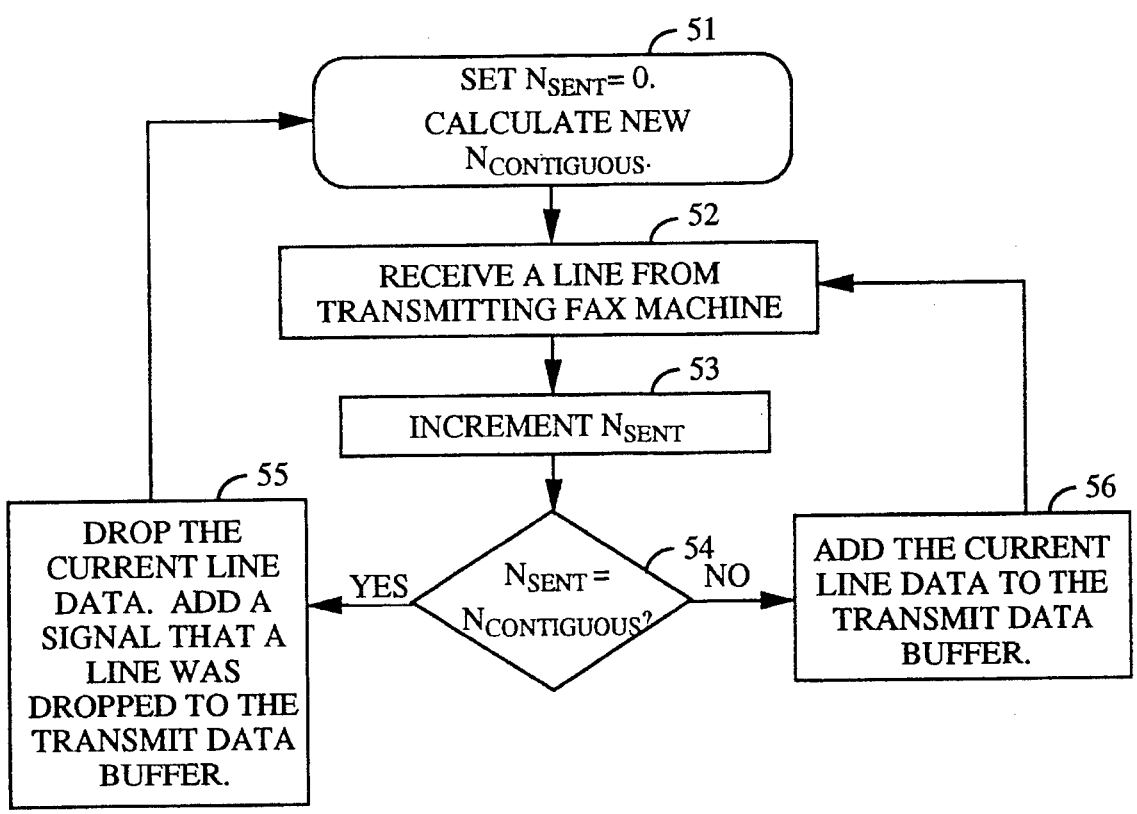
FIG. 5 is a flow-diagram illustrating the steps involved in another method for minimizing data bottlenecks in accordance with the present invention.

Referring now to FIG. 5, a flow-diagram is provided depicting the use of equation (3) to determine which data lines to drop. As shown in step 51, a counter, $N_{sent}$, is initially set to zero, for which $N_{min-sent}$ represents a minimum threshold of contiguous undropped data lines that must be met before a line can be dropped. Also in step 51, $N_{contiguous}$ is calculated per equation (3). After completing step 51, a data line is received in the first side of the LDRN 34 from the transmitting FAX machine, as depicted in step 52. Next, $N_{sent}$ is incremented in step 53, after which $N_{sent}$ is compared to $N_{contiguous}$ in step 54.

According to step 54, if $N_{sent}$ equals $N_{contiguous}$, the currently received data line is dropped, and an indicator signal is generated indicating that a data line was dropped from the LDRN data transmit buffer, as shown in step 55. If, however, $N_{sent}$ does not equal $N_{contiguous}$, the currently received data line is stored into the LDRN data transmit buffer, indicated by step 56. Following execution of step 55, step 51 is repeated, resulting in $N_{sent}$ being reset to zero and $N_{contiguous}$ being recalculated. Following execution of Step 56, however, the loop is continued, returning to step 52 and repeating that step as well as steps 53 and 54.

Alternatively, a data bottleneck in the LDRN 34 can be minimized by dropping data lines based on the current depth of the data bottleneck and the length of the incoming data lines. By dropping the longest data lines, the benefit of dropping data lines is maximized. In accordance with this method, a Line Length Threshold ($L_{min}$) will be established, such that when the length of a data line exceeds $L_{min}$, the data line will be dropped in the LDRN. Referring again to FIG. 3, in this method, a data stream is transmitted from the first FAX machine 12 to the first side of the digital LDRN 34. The data stream, corresponding to image data being scanned from a document page by the first FAX machine 12, has a number of data lines, each of which has a line length (i.e., an amount of data corresponding to the number of data bits contained in each data line). Once received by the first side of the LDRN 34, the data stream is processed, including dropping each of the data lines for which the line length exceeds $L_{min}$.

The algorithm in the LDRN 34 setting $L_{min}$ can be fixed or dynamic. Where $L_{min}$ is fixed, in the first side of the LDRN each of the incoming data lines are compared to the fixed $L_{min}$ value, and any data lines exceeding $L_{min}$ are discarded. The value corresponding to the fixed $L_{min}$ differs for different facsimile data rates and different LDRN data rates. Values corresponding to such a differing $L_{min}$ can be implemented in an $L_{min}$ lookup table.

In a dynamic system, $L_{min}$ will vary based on the current depth of the data bottleneck data transmit buffer in the first side of the LDRN 34. To calculate dynamic $L_{min}$, an algorithm is used. This algorithm employs the amount of data, $L_{bottleneck}$, stored in the data transmit buffer, such that $L_{min}$ is a decreasing function of $L_{Bottleneck}$ (i.e., $L_{min}$ decreases as $L_{Bottleneck}$ increases), and thus more lines get dropped as the bottleneck grows. Accordingly, as the LDRN gets farther and farther behind in its data transmission, $L_{min}$ will decrease, resulting in shorter and shorter data lines being dropped. Conversely, as the LDRN data bottleneck becomes smaller, $L_{min}$ will increase, causing only longer data lines to be dropped.

After being processed, the data stream, minus the dropped lines, is transmitted from the first side to the second side of the LDRN 34. Along with the processed data, short indicator signals will be transmitted, each of which corresponds to and indicates a dropped data line. Once received at the second side of the digital LDRN 34, the second side will insert a data line for each of the dropped data lines. Determination of when and whether to insert the data line follows from the transmitted indicator signals. As discussed above, the inserted line can be a repeat of the last data line preceding the dropped data line, or the second side of the LDRN can create a data line to insert by performing image processing on N data lines preceding the dropped data line.

In a fourth embodiment of the present invention, another method for minimizing data bottlenecks in an LDRN involves dropping fill bits in one side of the LDRN and reinserting them in the other. Two FAX machines communicating with each other are capable of negotiating a value corresponding to a Minimum Scan Line Time (MSLT). The MSLT is a conventional feature of T.30, compensating for slower paper feeding/scanning mechanisms within FAX machines. When a data line encodes into only a few bits (e.g., a blank line), the transmission time for these bits can be less than the MSLT. In the event this occurs, the transmitting FAX machine inserts fill bits at the end of the data line causing the transmit time for that data line to be at least as long as the MSLT.

In this fill bit method, the MSLT can be used to minimize the data bottleneck in an LDRN. Referring again to FIG. 3, the first and second FAX machines 12, 16 first negotiate a value corresponding to the MSLT. The transmitting machine (e.g., the first FAX machine 12) then scans and encodes the image data appearing on a document page into data lines. Next, the first FAX machine 12 processes the scanned and encoded data, including inserting fill bits into each of the data lines in which the number of bits is less than that value corresponding to the MSLT value. Such processing causes the transmission time for each of the encoded data lines to equal or exceed the MSLT. The processed data is then transmitted to the first side of the LDRN 34, where it is again processed. In this second processing step, all of the fill bits are removed from the filled data lines.

The data, minus the fill bits, is then sent from the first side of the LDRN 34 to the second side of the LDRN. There, the data is processed a third time, including reinserting the removed fill bits into their corresponding data lines. When and whether the second side of the LDRN 34 will insert fill bits into a data line is determined according to the following equation:

$$T_{line} = L_{line}/R_{fax}, \qquad (4)$$

where $T_{line}$ equals the transmit time for the fax data line, $L_{line}$ equals the amount of data in the fax data line, and $R_{fax}$ equals the facsimile transmission data rate. For each data line, if $T_{line}<MSLT$, fill bits are inserted by the second side of the LDRN 34 before the end of the data line, thus increasing $L_{line}$ and $T_{line}$ until $T_{line}$ is greater than or equal to the MSLT.

Accordingly, the data lines will have reattained their filled status as they were transmitted from the first FAX machine 12 to the first side of LDRN 34. These newly filled data lines, as well as the rest of the scanned image data, is then sent from the second side of the LDRN to the second FAX machine 16. In this way, none of the fill bits is sent over the LDRN, thus saving time in transmitting the facsimile image. As with the other embodiments described herein, this fill bit method can be implemented in the LDRN 34 and/or FAX modems 32, 36 using hardware, software, or some combination of the two.

Those skilled in the art will recognize that the methods and apparatus described herein can be implemented on a variety of facsimile networks. Such networks would include not only digital wireless networks, but also analog wireless networks. Indeed, the methods and apparatus described herein can be implemented in any LDRN over which facsimile images are transmitted and in which data bottlenecks can occur during such transmissions.

Accordingly, it will be apparent to those skilled in the art that various modifications and variations can be made in the apparatus and process of the present invention without departing from the spirit or scope of the invention. Thus, it is intended that the present invention covers the modifications and variations of this invention, provided they come within the scope of the appended claims and their equivalents.

What is claimed is:

1. A method for minimizing a data bottleneck in a Low Data Rate Network (LDRN), said LDRN having a first side and a second side, said method comprising the steps of:

transmitting a data stream from a facsimile (FAX) machine to said first side of said LDRN, said data stream having a plurality of lines of data, each of said plurality of lines of data having a line length;

setting a line length threshold ($L_{min}$) for the LDRN, which is a maximum amount of data to be transferred over the LDRN for each line of facsimile data, said threshold being based on the data bottleneck in the LDRN; and processing, in said first side of said LDRN, said transmitted data stream, including dropping each of said plurality of data lines having a line length exceeding $L_{min}$.

2. The method recited in claim 1 wherein $L_{min}$ has one of a plurality of fixed values.

3. The method recited in claim 1 wherein the data bottleneck comprises a quantity of data, and wherein $L_{min}$ varies depending on said quantity of data.

4. The method recited in claim 3 wherein $L_{min}$ decreases as said quantity of data for said bottleneck increases, and increases as said quantity of data for said bottleneck decreases.

\* \* \* \* \*